UNITED STATES PATENT OFFICE.

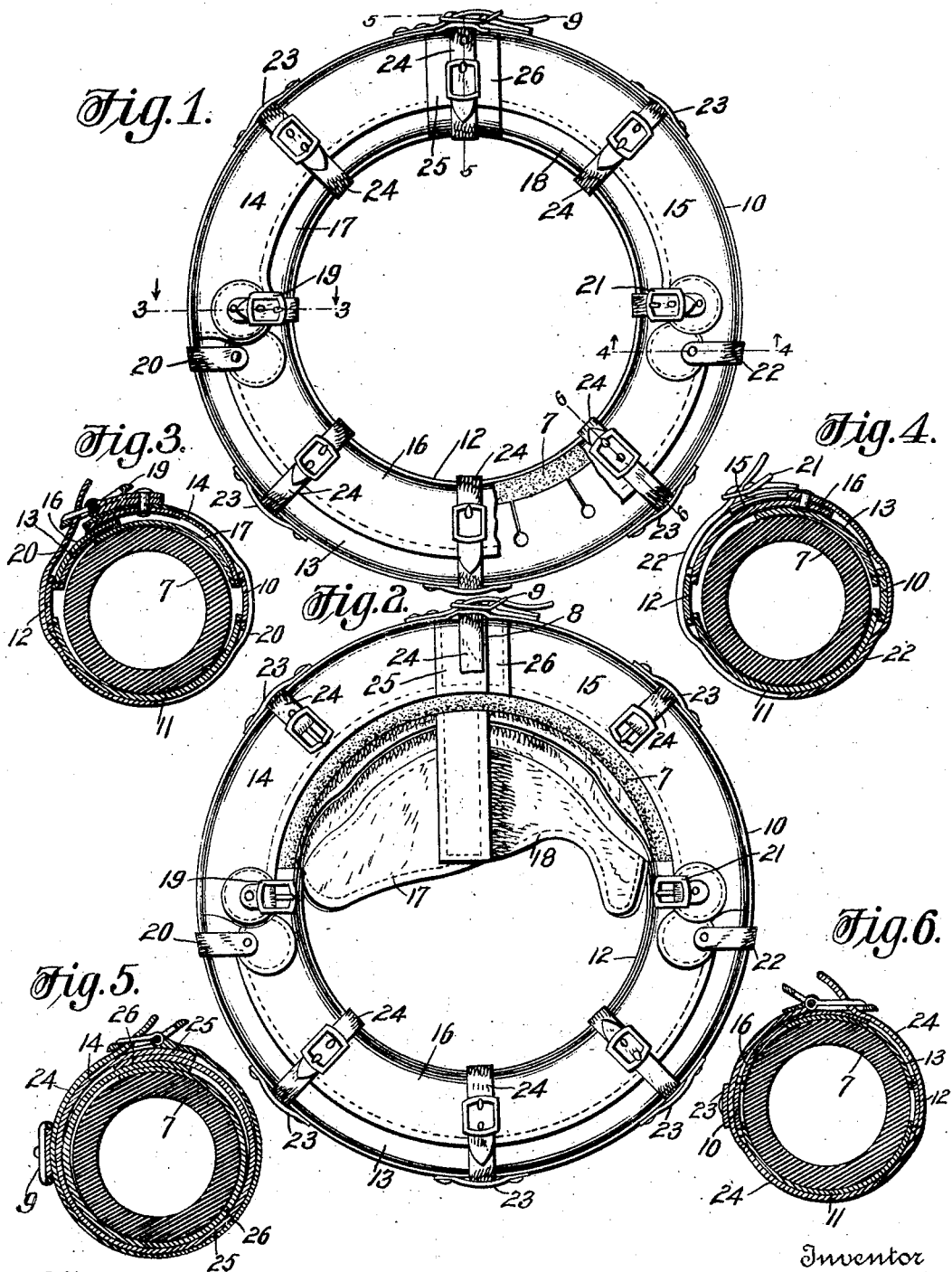

BENJAMIN NATHAN, OF NEW YORK, N. Y.

COVERING FOR AUTOMOBILE-TIRES.

No. 799,662.     Specification of Letters Patent.     Patented Sept. 19, 1905.

Application filed December 20, 1904. Serial No. 237,598.

*To all whom it may concern:*

Be it known that I, BENJAMIN NATHAN, a citizen of the United States, residing at New York, in the county of New York and State of New York, have invented certain new and useful Improvements in Coverings for Automobile-Tires, of which the following is a specification.

This invention relates to bags or covers for inclosing tires for automobiles or other vehicles.

Usually an automobile is supplied with one or more extra tires. Inasmuch as these extra tires are generally carried on the back of the vehicle, where they would be exposed to the deteriorating effects of rain, dust, &c., it is therefore necessary to protect them by inclosing them in suitable covers.

The object of the present invention is to provide an improved cover for this purpose which will fully protect the tire against any and all of the bad effects due to carrying it uncovered or imperfectly covered; and with this object in view the invention consists in the improved bag or cover for tires which will be hereinafter fully described and afterward specifically claimed.

In the accompanying drawings, which illustrate a bag or cover made in accordance with this invention, Figure 1 is a view in elevation, the cover being closed and a part broken away. Fig. 2 is a similar view with the upper half of the front portion opened out. Fig. 3 is a transverse sectional view on the broken line 3 3 of Fig. 1 looking downward. Fig. 4 is a similar view on the line 4 4 looking upward. Fig. 5 is a similar view on the line 5 5 looking to the right, and Fig. 6 is a similar view on the line 6 6 looking to the left.

In the drawings the cover placed on the tire is shown in Fig. 1 in the position it is intended to rest, and the terms "upper" and "lower," hereinafter used, are intended to apply to the device in that position, while the terms "front" and "back" are used to designate, respectively, the part of the cover away from the vehicle and that lying against it when the tire is hung up, and the terms "inner" and "outer" have reference to the inner and outer circles of the tire and its cover when closed thereon.

Referring specifically to the drawings, 7 indicates the tire, which is shown in all the figures inclosed, except in Fig. 2, in which it is but partially inclosed. The bag or cover, which when closed over the tire forms an annulus or ring, is openable at the top 8, the two ends overlapping at this point and being provided, respectively, with a strap and buckle 9 or other suitable fastening by means of which they can be drawn together or secured. In this instance the strap and buckle are secured on an outer peripheral strip 10, which extends from end to end of the cover when open and connects the back half 11 with the front outer portion of the cover.

The back half of the cover consists of several sections shaped and secured end to end, forming the half of an annular tube in which the back half of the tire rests when the tire is inclosed. To the inner edge of the back half is an inner peripheral strip 12, which extends the full length of the cover when open.

The front portion of the cover is composed of three sections 13, 14, and 15, of which 13 is of a length slightly exceeding one-half of the length of the complete cover or the back half and 14 and 15 each of a length slightly exceeding one-quarter thereof. Of these parts the lower outer half-section 13 extends in length around the lower half of the tire or cover, is secured to the front edge of the outer strip 10, extends from that strip in radial width about one-third around the tire, and is radially slitted outwardly from its inner edge, as shown in Fig. 1. It may be made of one piece or in pieces secured together end to end. The two upper outer front quarter-sections 14 and 15 are secured to the front edge of the outer strip 10 and extend from the opposite ends of the section 13 to the respective ends of the cover when opened. The inner front portion of the cover also comprises three sections, all secured to the inner edge of the inner peripheral strip 12 and all of about the width of the corresponding outer front sections. Of these three sections, 16 indicates the lower inner half-section and 17 and 18 the upper inner quarter-sections. In securing these front sections to the inner edge of the inner peripheral strip 12 the lower ends of the upper outer quarter-sections 14 and 15 are made to slightly overlap the upper ends of the lower outer half-section 13 and the lower ends of the upper inner quarter-sections 17 and 18 to slightly overlap the upper ends of the lower inner half-section 16. To the adjacent ends of the inner half-section 16 and the outer quarter-sections 14 and 15 are secured the opposite parts of suitable means for drawing the parts tightly together and securely holding them in those positions, such means being in this instance buckles 19 and 21 on the quarter-sections 14 and 15 and straps 20 and 22 on the opposite corresponding ends of the half-section 16.

Besides the means hereinbefore described for securing the cover loops 23 are provided at intervals, through which suitable straps 24 may be passed to further secure the cover on the tire.

To inclose a tire in the cover, the securing means are all loosened and disconnected, the inner and outer front sections opened out, and the cover drawn on the tire from front to back. The lower inner half-section 16 is lapped over the lower outer half-section 13, while the upper inner quarter-sections 17 and 18, with their inner ends overlapping the upper ends of the half-section 16, are overlapped by the upper outer quarter-sections 14 and 15, whose lower ends overlap the whole joints formed by the half and quarter sections. The straps at the top end of the cover are now tightly drawn, bringing the ends together so that one overlaps the other, with the upper ends of the inner quarter-sections overlapped next to the tire and the overlapped ends of the outer quarter-sections covering the joint between the ends of the inner quarter-sections. The other securing means are now drawn tight, so that the tire is snugly inclosed and entirely covered, the overlapping ends and edges of the various sections being in position to shed any water which may fall upon the cover, and thus entirely protect it from rain and from dust or other deteriorating influences.

The cover may be made of any suitable waterproof material.

The overlapping ends of the cover, which overlap each other at 8, Fig. 2, are provided with or formed as transverse bands 25 and 26, as clearly shown in Fig. 5, such bands being joined to the ends of the straps 10 and 12, the back half 11, and the four upper front quarter-sections 14, 15, 17, and 18, this form making a better joint than would be made if the ends of these parts overlapped.

If desired, the back half 11 may be made in two separate parts secured to the upper and lower front sections, thus forming the whole cover of two separate upper and lower sections securable by straps and buckles.

What I claim as new is—

1. A cover adapted, when closed about a tire, to form an annular tube, the opening to receive the tire being from the front and all exposed edges of the cover in its closed or tubular form being overlapped in the same general direction, to shed rain when the cover and its inclosed tire are hung up.

2. A cover adapted, when closed about a tire, to form an annular tube, the meeting ends of which in its closed or tubular form are overlapped and securing means attached to said ends to exert force thereon in opposite directions in line with the periphery of the tube.

3. A cover adapted, when inclosing a tire, to form an annular tube, said cover comprising a back section, and inner and outer front sections, the adjacent edges of said front sections being overlapped when brought together.

4. A cover adapted, when inclosing a tire, to form an annular tube, said cover comprising a back section, and inner and outer front sections, the adjacent ends of said front sections being overlapped when brought together.

5. A cover adapted, when inclosing a tire, to form an annular tube, said cover comprising a back section, and inner and outer front sections, the adjacent ends and edges of said front sections being overlapped when brought together.

6. A cover adapted, when inclosing a tire, to form an annular tube, said cover comprising a back section, and upper and lower inner and outer front sections, the edges of the upper outer sections overlapping the upper inner sections, and the edges of the lower inner section overlapping the lower outer section.

7. A cover adapted, when inclosing a tire, to form an annular tube, said cover comprising a back section, and upper and lower inner and outer front sections, the edges of the upper outer sections overlapping the upper inner sections, the edges of the lower inner section overlapping the lower outer section, and the ends of the upper sections overlapping the ends of the lower sections.

8. A cover adapted, when inclosing a tire, to form an annular tube, said cover comprising a back section, and upper inner and outer quarter-sections and lower inner and outer half-sections, the edges of adjacent sections being overlapped.

9. A cover adapted, when inclosing a tire, to form an annular tube, said cover comprising a back section, and upper inner and outer quarter-sections and lower inner and outer half-sections, the edges of adjacent sections being overlapped, the meeting ends of the sections and of the whole cover being also overlapped.

10. A cover adapted, when inclosing a tire, to form an annular tube, said cover comprising a back section, inner and outer peripheral strips joined thereto, inner and outer front sections joined to said strips, and transverse terminal bands secured to all of said parts.

In testimony whereof I affix my signature in presence of two witnesses.

BENJAMIN NATHAN.

Witnesses:
STEPHEN S. NEWTON,
ALAN McDONNELL.